United States Patent
Jones et al.

(10) Patent No.: US 7,407,915 B2
(45) Date of Patent: Aug. 5, 2008

(54) POLYMER HYDRATION METHOD USING MICROEMULSIONS

(75) Inventors: Thomas A. Jones, Cypress, TX (US); Tom Wentzler, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 56 days.

(21) Appl. No.: 11/289,197

(22) Filed: Nov. 29, 2005

(65) Prior Publication Data

US 2007/0123431 A1    May 31, 2007

(51) Int. Cl.
*C09K 8/60* (2006.01)
*B01F 3/08* (2006.01)
*B01F 17/00* (2006.01)

(52) U.S. Cl. ............ 507/219; 507/209; 507/211; 507/213; 516/21; 516/22; 516/198

(58) Field of Classification Search .......... 507/209, 507/211, 213, 219; 516/21, 22, 198
See application file for complete search history.

(56) References Cited

U.S. PATENT DOCUMENTS

| 4,271,907 A | * | 6/1981 | Gale ................ 166/270.1 |
|---|---|---|---|
| 4,330,414 A | | 5/1982 | Hoover |
| 4,392,964 A | | 7/1983 | House et al. |
| 4,427,336 A | | 1/1984 | House et al. |
| 4,435,217 A | | 3/1984 | House |
| 4,435,564 A | | 3/1984 | House |
| 4,439,333 A | | 3/1984 | House et al. |
| 4,476,032 A | | 10/1984 | House et al. |
| 4,496,468 A | | 1/1985 | House et al. |
| 4,762,625 A | | 8/1988 | Dadgar |
| 6,613,720 B1 | | 9/2003 | Feraud et al. |
| 6,800,593 B2 | | 10/2004 | Dobson, Jr. et al. |
| 7,134,496 B2 | * | 11/2006 | Jones et al. ........... 166/278 |

* cited by examiner

*Primary Examiner*—Randy Gulakowski
*Assistant Examiner*—Timothy J. Kugel
(74) *Attorney, Agent, or Firm*—Madan, Mossman & Sriram P.C.

(57) ABSTRACT

Long-chained polymer compounds are useful to viscosify aqueous brine fluids so that they can function as drilling fluids, completion/workover fluids, fracturing fluids, agricultural products, cleaning compounds, etc. These polymers may be hydrated with a microemulsion or lactescent emulsion prior to being added to the target fluid. The rate and completeness of hydration by this method are controlled and improved. In one non-limiting embodiment the microemulsion includes a polar hydrocarbon component, a nonpolar hydrocarbon oil, a small amount of water, a surfactant and optionally a co-surfactant.

17 Claims, No Drawings

POLYMER HYDRATION METHOD USING MICROEMULSIONS

TECHNICAL FIELD

The present invention relates to methods and compositions for hydrating viscosifying polymers, and more particularly relates, in one embodiment, to methods and compositions for hydrating or viscosifying polymers using microemulsions.

BACKGROUND

Polymer compounds are frequently used to increase the viscosity of drilling fluids, fertilizers, completion fluids, etc. to improve the fluids' ability to carry solids, prevent fluid loss, etc. Further, situations arise when it is desired to increase the viscosity of an aqueous cleaning fluid so that it releases more slowly from a hard surface that is to be cleaned of grease, oil or other debris.

Often, problems arise when attempting to viscosify fluids such as brines that have high concentrations of dissolved salts, such as $CaBr_2$, $CaCl_2$, NaBr, $ZnBr_2$ and the like. When polymer is added directly to these brines, some of the difficulties encountered include, but are not necessarily limited to: (1) failure of the polymer to yield or viscosify in the aqueous environment; (2) formation of "fish-eyes"; (3) formation of a distinct gel phase; (4) slow rate of viscosification or hydration of the polymer; and (5) incomplete polymer hydration.

Failure of the polymer to hydrate is a more extreme problem when the polymer used to viscosify the aqueous fluid does not interact with the target fluid. The desired effect would be for the polymer to absorb water or "hydrate" such that it eventually becomes soluble in the aqueous medium and imparts a higher viscosity to the brine as compared with the brine without the polymer. This situation arises when there are high concentrations of salts dissolved within the aqueous fluid such as is the case with completion and workover brines. In these aqueous brines there is but a limited amount of free water available to hydrate the polymer. In addition, the small amount of water that is present in the brine can be chemically interacting with the dissolved salts and further limiting its activity. The net result is that the chemical potential differential is very low if not non-existent and hydration of the polymer does not occur.

When polymer is added to brine as a dry powder, lumps may be created that are referred to in the industry as "fish-eyes". A fish-eye is a term that is used to describe the small polymer particles having a hydrated outer shell with a dry core. They may be prevalent in systems where there is inadequate mixing and therefore, low shear forces. Note that in this discussion particles are used to describe discrete groupings of polymer. Thus, a particle, in actuality, is a mass of tangled polymer chains that are wrapped around each other and held in close contact due to hydrogen bonding. Many polymers, on a molecular level, will form hydrogen bonds to each other creating a tight mass that does not become dispersed until the shearing forces exceed these bonding forces. Nevertheless, rapid hydration will take place at the interface between the polymer droplet and the aqueous medium. This surface hydration leads to the formation of a tight gel-like surface that limits the further diffusion of water into the core of the polymer mass, leaving interior polymer chains unhydrated. The fluid will then have different sized gel particles that do not dissolve. Dissolving is a second step in the viscosification process where the polymers that have hydrated, begin to untangle and become discrete entities unto themselves in a brine fluid. The size and number of polymer particles relates inversely to the level of agitation in the mixing vessel.

Fish-eye formation is not a good thing. Because the hydration is incomplete, the use of expensive polymer is very inefficient, as more polymer must be used to achieve the desired viscosity. In addition, these partially reacted polymer gel particles can be damaging to the producing formation of an oil or gas well. These unhydrated particles can flow into a producing formation and cause plugging. Often their successful removal is difficult if not impossible. This plugging, which can result in formation damage, may likely reduce the hydrocarbon production from the reservoir.

The polymer gels may also plug filters, limiting their on-stream time and making them difficult to clean and bring back on line. The filter blinding difficulty leads to increased downtime on a rig or production platform. Downtime on a rig relates directly to increased costs. In certain brine environments, the hydration proceeds beyond the fish-eye stage, but the brine and the gelled polymer remain as separate phases. Some of the brine hydrates the polymer, but the hydrated polymer remains as a separate phase from the brine because the individual polymer chains are still entangled. This problem is known to occur in heavy brines when the mixing capabilities are less than adequate. In both situations, inadequate mixing limits the homogeneity of the final viscosified brine. By not hydrating the polymer completely, more polymer is required to attain the desired viscosity leading to higher polymer costs.

To a certain degree, the problems with polymers like hydroxyethylcellulose (HEC), carboxymethylcellulose (CMC), hydroxyethylcarboxymethylcellulose (CMHEC), and the like may be reduced with intense mixing during addition and further improved by increasing the temperature. However, excellent mixing of polymer and brine is not always possible and seasonal variations in temperature can also lead to poor hydration of the polymer. Even with good mixing, hydration can be slow and the fish-eyes still form, albeit smaller in size. The very small fish-eyes may be much more damaging to a producing formation because they have the potential to migrate further into the formation before becoming lodged in reservoir pore throats. At this point their removal is difficult and the very effort made to remove them may lead to even more reservoir formation damage.

The aforementioned difficulties have been recognized and steps have been taken to minimize the problems by pre-hydrating brines in a controlled environment where near-impermeable gels are avoided. Thus, products like HEC powders are pre-mixed as a liquid dispersion in a non-polar environment so that the clumping and fish-eye problems caused by hydrogen bonding are reduced. U.S. Pat. Nos. 4,330,414; 4,392,964; 4,427,556; 4,435,217 and 4,496,468 describe methods of premixing of HEC polymer prior to its addition to an aqueous brine fluid.

U.S. Pat. No. 4,330,414 relates to a hydrophilic polymer composition for use in thickening aqueous mediums comprising HEC and a water miscible polar organic liquid which acts as solvating agent for the hydroxyethyl cellulose, where the solvating agent is a type which forms a semi-solid to viscous mixture with the hydroxyethyl cellulose under certain conditions. The polymeric composition alone, or in admixture with a diluting agent which is a non-solvating agent for the hydroxyethyl cellulose, can be added to aqueous mediums, particularly heavy brines, to produce well servicing fluids.

A polymeric composition useful in the thickening of aqueous brines comprising HEC, a water miscible organic liquid and an aqueous liquid is described in U.S. Pat. No. 4,392,964.

U.S. Pat. No. 4,435,217 concerns improving the thermal aging stability of liquid suspensions of hydrophilic, water-soluble polymers in an organic liquid by adding to the suspension a liquid fatty acid. Superior liquid polymer compositions having improved resistance to settling (syneresis), thermal aging characteristics, viscosity, and dispersibility in aqueous liquids comprise from about 40% to about 55% of an organic liquid, from about 35% to about 55% of a hydrophilic, watersoluble polymer, from about 2.0% to about 4.5% of an organophilic clay suspending agent, from about 0% to about 2.0% of a dispersant for the organophilic clay, from about 0.5% to about 2.5% of a non-ionic surfactant, and from about 1.25% to about 5.0% of a liquid fatty acid.

Processes are disclosed for activating HEC in U.S. Pat. No. 4,435,564 such that the HEC will disperse and hydrate in compatible heavy brines having a density greater than about 13.5 pounds per gallon (1.62 kg/liter) containing one or more salts including one or more of calcium chloride, calcium bromide, zinc chloride, and zinc bromide, at ambient temperatures such that the HEC will be at least 80% hydrated within one hour. The activation process comprises admixing the HEC with an organic liquid which has no appreciable swelling effect on the HEC and an amine activator. The invention in the '564 patent also provides activated HEC compositions and a process of increasing the viscosity of a heavy brine utilizing these compositions.

U.S. Pat. No. 4,439,333 involves polymeric compositions for, and methods of, increasing the viscosity of aqueous brine well servicing fluids by adding to the brine a composition containing HEC, a solid organic activating agent for the HEC, and a solvent for the activating agent which also functions as a suspending medium or carrier for the HEC.

A method of producing a well servicing fluid containing zinc bromide in which an activated HEC is either admixed with a zinc bromide solution containing above about 30% by weight zinc bromide, or, in the alternative, is admixed with a non-zinc bromide containing solution to produce a viscosified solution which is then admixed with a zinc bromide containing solution is described in U.S. Pat. No. 4,476,032.

U.S. Pat. No. 4,496,468 concerns a method of activating HEC such that the HEC will hydrate in heavy brines having a density greater than about 13.5 pounds per gallon (1.62 kg/l) at ambient temperature. The activated HEC compositions so produced, and viscous well servicing compositions wherein an oleaginous liquid and a compatibilizing agent are admixed to form a viscous slurry, admixing therewith an aqueous solution of an inorganic salt which has an exothermic heat of solution, and thereafter admixing HEC therewith to form a viscous pourable composition are described.

Alkali and alkaline earth metal and zinc halide brines are also known to be viscosified with compositions incorporating a viscosity inducing hydrophilic polymer, mineral oil, oil soluble non-ionic surfactants, polar solvents, and diluent.

In spite of these improvements, concerns still exist. Pre-hydration of polymer, once started, is not easily stopped. Thus, a dilemma arises: in order to have rapid hydration or viscosification on an oil exploration rig e.g., either a powerful pre-hydrator must be added or a large amount of polymer must be added. This addition is not only expensive, but also it initiates the hydration of the polymer in the container or vessel that cannot be easily stopped. If the container used to inventory the polymer is not used promptly, then hydration may go to completion or to a point where the material cannot be removed from the container at all. This is not desirable because the polymer in the container must be in a liquid state where pourability is maintained. Otherwise, the labor costs associated with getting the polymer into the brine system will be excessive. Further, when the polymer hydration is near completion, it often has a rigid gel structure that prevents the homogeneous viscosification of the brine. Another problem that parallels that of the fish-eyes is now encountered. Solutions to these problems may involve: (1) putting less HEC or other polymer into the container, or (2) adding more of a non-reactive diluent to limit the rate of polymer hydration. These supposed remedies have their downside as well. By inhibiting the rate of pre-hydration, the rate of hydration in the brine is reduced, increasing the amount of costly rig time. Also these measures limit the amount of polymer that can be put into the container causing more containers being required at the rig location to achieve the desired effect. This means that more of the associated chemicals in the admixture per unit weight of polymer must be increased to achieve the desired viscosity effect. In addition, the labor, container and freight costs associated with this remedy will increase. Also, when the polymer concentration added from the container is low, unacceptable lowering of the brine fluid density occurs. Now additional amounts of the expensive high density brine must be added to bring the brine back to the desired density. The higher the density difference between the polymer admixture and the brine, the more serious this problem becomes. For example for high density zinc brines at the upper limit of their density, compensation with additional brine cannot be achieved without adding special formulations.

With all of these recognized issues, still another less apparent problem exists. Until the some of the approaches discussed above, fish-eyes were quite visible to the rig personnel because they were relatively large and blinded filters and shaker screens. They surmised that these larger "gel-balls" would also cause damage to the producing formations. The improvements did not necessarily cause them to disappear. Instead, they became smaller and less noticeable. While the problems associated with screens and filters were reduced, the potential for formation damage increased. These very small fish-eyes now could proceed further into the formation before causing the plugging of pore throats. This interior damage is much more difficult to reverse and much more expensive, as it reduces the well production and revenues.

SUMMARY

There is provided in one non-restrictive embodiment a method for hydrating a polymer that involves forming a microemulsion by mixing water with a polar component and at least one surfactant of a type and in an amount effective to form a microemulsion; and contacting the polymer with the microemulsion. In another non-limiting embodiment, the polymer contacted with the microemulsion is added to brine.

In another non-limiting embodiment there is provided a method for hydrating a polymer that involves forming a microemulsion by mixing water with a polar hydrocarbon component, a surfactant having a high hydrophilic/lipophilic balance (HLB) number (>10), nonpolar diluent oil and a surfactant having a low HLB number (<5) and in an amount effective to form a microemulsion; and contacting the polymer with the microemulsion. In another non-limiting embodiment, the polymer contacted with the microemulsion is added to brine.

DETAILED DESCRIPTION

Potential objectives of the method include, but are not necessarily limited to, one or more of: (1) achieving a very rapid hydration in brines compared to conventional hydration methods; (2) eliminating the formation of fish-eyes, including the microscopic ones; (3) increasing the concentration of polymer that can be placed in a container; (4) viscosifying very "difficult to hydrate" brines such as those containing three salts or those containing zinc bromide, or the like; (5) eliminating the need for suspending agents to keep the polymer from settling and hardening in pails or containers prior to use at the rig site; and/or (6) reducing the amount of costly pre-hydration solvent required to achieve high rates of viscosification.

One or more of the above objectives, and possibly others, may be achieved by utilizing the concepts associated with the creation of a microemulsion as a tool to viscosify or hydrate polymers. The polymer pre-dispersion and polymer pre-hydration may be carefully controlled so that the conflicting objectives associated with the polymer hydration rate are minimized. In one non-limiting embodiment, the polymer should begin its hydration before being put into use in brine fluids, otherwise the hydration rate is too slow and not economically practical. However, when hydration is initiated in the storage container prior to use, it cannot arbitrarily be stopped. If the pre-hydration rate is slow, then the rate of hydration and viscosification in brine is slow. If the pre-hydration rate is fast, then the polymer will have a limited shelf life because it hydrates to a gelation point where it no longer is effective either because it no longer mixes homogeneously with brines or because it gels so extensively that it cannot be easily removed from its storage container. By using a microemulsion as a medium for pre-hydration, the rate of pre-hydration can be controlled so that excessive gelation can be eliminated while keeping the hydration rate in brines much faster than previously thought to be possible. In one non-limiting embodiment, the microemulsion is a water-in-oil emulsion. This form helps precisely control the amount of water to be substantially all that is necessary to hydrate the polymer, but not excessively gel (hydrate) the polymer. Excessive gelation or hydration is defined herein as hydrating to the point where handling is interfered with or the polymer cannot be poured or alternatively cannot be easily pumped.

Microemulsions form spontaneously by mixing water and oil with a surfactant and co-surfactant. The theory of microemulsions has been reviewed in several texts such as D. O. Shah, ed., *Micelles, Microemulsions and Monolayers*, Marcel Dekker, New York, 1998. After discovering their existence, it was determined that the thermodynamics are such that they form spontaneously and remain stable. They are clear in appearance because the emulsion droplets are so small that they do not scatter light. Alternatively, the microemulsions may be lactescent or translucent where the droplet size distribution is larger than that for a microemulsion but smaller than that of a standard emulsion generated via mechanical shearing. Hydration of polymer is classified as a heterogeneous reaction because two separate phases are reacting with each other. The rate of most heterogeneous reactions is controlled by the diffusion rate. In turn, the diffusion rate is directly proportional to the surface area of the separate phases. Thus, it is the ability to form a homogeneous mixture having extremely small droplets and thus a high surface area of phase interface that is believed to be of use in the methods described herein, although there is no wish to be limited by any one theory.

Microemulsions have been used to strip oil from producing reservoirs and to clean grease and oil from hard surfaces. It has been determined that microemulsions have merit for hydrating polymers where the conflicting objectives described above come into play. In the prior art oil-stripping or cleaning methods, the oil phase serves a useful, but not important role or function. In the microemulsion methods herein, the oil phase has an important role. In one non-limiting embodiment, the oil may be the rate regulator for the hydration of the polymers. It may be used to quench the pre-hydration on a "designed basis". Further, the oil phase may be modified so that the quenching role that it takes in a container or tank is diminished quickly once faster hydration is desired in completion fluids brine.

To create a microemulsion in a traditional sense for the cleaning of hard surfaces, three components should be present: oil, water and surfactant where the oil concentration is kept as low as possible so that when it encounters a grease laden surface, it has the capacity to accept more oil without destabilizing; With the polymer hydration methods herein, the goal is somewhat similar, but different: e.g. use enough oil to trigger the formation of a microemulsion, but no more than this minimal amount. By utilizing this reasoning, the pre-hydrating solvent can be made to be nano-sized as compared with the emulsions formed by the method of U.S. Pat. No. 4,439,765 where 700 rpm shearing rates are required. Including an additional surfactant in this oil phase further enhances this concept. The benefit is rapid and uniform brine hydration that is more readily accomplished because the oil releases from the polymer. That is, without wishing to be limited to any one theory, the oil acts as a diffusion barrier when the polymer is in the container. Once it is added to the brine, the oil layer deteriorates rapidly because the surfactant promotes emulsification and spalling from the polymer surface. Thus, it is desirable, but not essential to use a surfactant that has a HLB number that matches, is approximately the same as, or is close to that of the oil phase. By example, if the oil phase has an HLB number of four, then it would be desirable to have a surfactant with an HLB of four or less. While the HLB of the surfactant can be higher by 1-2 units than that of the oil, most preferably the surfactant HLB is lower. Thus, "approximately the same as" may mean the HLB of the surfactant is 2 units higher than that of the oil phase or less than this number, or alternatively the same as that of the oil phase or less.

The oil/surfactant blend can be used to play an additional role herein. After adding a polymer to the microemulsion, e.g. HEC, it begins to hydrate rapidly. If left unabated, the hydration would continue to the point where excessive gelation sets in and the admixture would be unpourable. However, by carefully monitoring the viscosity, an oil/surfactant solution may be used to provide additional quenching to the solvation reaction where the amount of the oil/surfactant solution is adjusted to attain the desired shelf life. The surfactant is part of this quenching mixture because it serves a role once the admixture is added to a completion/workover brine. The surfactant may act as an enabler to emulsification by pulling or drawing the oil phase away under a shearing action. The oil shears away from the polymer in the brine during mixing. The oil served its role in the container by quenching or limiting the hydration reaction. Once in the brine fluid, an objective is to eliminate this rate-controlling medium as quickly as possible. The surfactant enables that objective to be realized. The effect may be dramatic. As will be shown in the Examples, brines that would take over an hour to viscosify without the rate-controlling mechanism now may be viscosified in less than one minute. To summarize, a small amount of non-polar, hydrocarbon oil is very helpful to form the microemulsion. After polymer is added, more oil may be added to slow the hydration. Alternatively, the oil all can be added at once if prior tests have dictated the amount required for each function.

Mixing a surfactant, co-surfactant, and non-polar oil with water or some other polar substance that is normally insoluble in the non-polar oil will create a stable emulsion if there is sufficient physical shearing action. In contrast, microemulsions form spontaneously and are transparent because the emulsion particles are so small that they do not scatter light. Mixing multiple surfactants and non-polar oils prior to blending to form the final microemulsion enhances the admixture relative to the objectives herein. A nonionic surfactant chosen for the non-polar oil may have a relatively low hydrophilic/lipophilic balance (HLB) number that matches the HLB number of the respective non-polar ingredient. The surfactant that serves as the "co-surfactant" in the microemulsion may also be a polar compound that serves as a pre-hydrating compound for the polymer. This combination serves to increase the dispersability of the polymer, and eliminates the need for a suspending agent for the polymer while in the container. Thus, in one non-limiting embodiment, the method and compositions are practiced in the absence of fillers, such as clays. It is also helpful in another non-restrictive embodiment for the compositions and methods of initially forming the brine fluids to be practiced in the absence of caustic compounds, such as NaOH and the like, and in addition or alternatively in the absence of an acid. The prohibitions against or avoidance of clays, acids, and alkaline (caustic) components only applies to the hydration of the polymer. Viscosified aqueous fluids containing a hydrated polymer or polymers used in hydrocarbon recovery, which may or may not be brines, may have clays, acids and/or alkaline (caustic) additives introduced thereto later for different purposes.

The increased amount of polymer dispersion serves to eliminate or greatly reduce the fish-eye phenomenon. Fish-eyes may come from two sources: (1) a hydrated shell of polymer having an unhydrated core; and/or (2) a polymer particle that may have a hydrated core, but has a shell area that has tightly bonded or gelled. While not wishing to be bound by any one theory, it is believed that the smaller polymer particles hydrate before they can form a strong gel that inhibits water diffusion to the core of polymer particles. Once a strong gel forms, it becomes difficult to cause the polymer to mix in a uniform fashion within the brine fluid. For the first case, large fish-eyes may be present, and for the latter case, very small fish-eyes may be present in the brine. In the latter case, the very small fish-eyes may be very damaging to the producing formation.

In more specific, but not limiting examples of the various components that may form the microemulsions of the compositions and methods herein, suitable non-polar diluent oils include, but are not necessarily limited to, white mineral oil, olefins, soy oil, esters, plant oils, $C_{8-20}$ paraffins, silicone oils, polyalphaolefins, carboxylic acids and mixtures thereof, and the like. In one non-restrictive embodiment, the surfactant is a non-ionic surfactant, and suitable surfactants may include, but are not necessarily limited to, ethoxylated fatty alcohols, fatty acids, alkylphenols, fatty amines (e.g. TOMADOL® 23-6.5, 1-5 products from Tomah Products, Inc., and TEGO-PREN® 5840, 5878 products available from Degussa), and mixtures thereof, and the like. Suitable co-surfactants may include, but are not necessarily limited to, monohydric alcohols, polyhydric alcohols, ketones, polyhydric alkyl ethers, ethers, pyrrolidones, and mixtures thereof, and the like. Exemplary monohydric alcohols include, but are not necessarily limited to, propyl alcohol, isopropyl alcohol, isobutyl alcohol, secondary butyl alcohol, tertiary butyl alcohol, normal amyl alcohol, secondary amyl alcohol. Exemplary polyhydric alcohols, but are not necessarily limited to, include polyethylene glycol, polypropylene glycol. Suitable ketones may include, but are not necessarily limited to, methyl ethyl ketone, diethyl ketone, methyl isobutyl ketone. Suitable ethers include, but are not necessarily limited to, ethylene glycol monoethyl ether, ethylene glycol monobutyl ether, diethylene glycol monoethyl ether, and the like. Suitable polymers may include, but are not necessarily limited to, hydroxyethylcellulose (HEC), carboxymethylcellulose (CMC), hydroxyethylcarboxymethylcellulose (CMHEC), carrageenan, guar, xanthan gum, starch, scleroglucan (sold in one embodiment under the trade name ACTIGUM™ by Degussa), partially hydrated polyacrylimides (PHPA), acrylamido-methyl-propane sulfonate polymer (AMPS) copolymers such as 2-acrylamido-2-methyl-propane sulfonic acid/N-alkylacrylamide and mixtures thereof, and the like.

In one optional, non-limiting embodiment herein, the proportions of the components may range from about 0.01 to about 5 wt % water; from about 5 to about 15 wt % polar component; and from about 1 to about 20 wt % surfactant, and optionally from about 1 to about 15 wt % co-surfactant. In a non-restrictive alternative, the proportions of the components may range from about 0.01 to about 1 wt % water; from about 5 to about 8 wt % polar component; and from about 2 to about 13 wt % surfactant, and optionally from about 2 to about 8 wt % co-surfactant. In the particular method herein, the components may be agitated to assist in forming the microemulsion, but it is not expected that the shear rates need be particularly high. In some non-limiting embodiments, water may present in a very small amount; e.g. less than 0.01%; that is, enough to start the microemulsion.

It is important to recognize that the aforementioned ranges serve to highlight likely parameters of operation. For one skilled in the art it would be recognized that these parameters and the associated objectives are interrelated closely. For example, if very fast hydration is desired at the expense of product shelf life, then more water may be included in the admixture. Along with more water, a concomitant amount of surfactant will be required to accommodate the interfacial surface area needs associated with a higher amount of water. That is, for the additional surface area between phases that is anticipated, more surfactant will be required to stabilize the interface.

It will be appreciated that it is not necessary for the polymer to be 100% hydrated after the practice of the method for the method to be considered successful, although that is a worthy goal. In one non-limiting embodiment the polymer may be at least 95% hydrated, alternatively at least 90% hydrated and in another embodiment at least 85% hydrated. In one non-limiting context, "substantially hydrated" herein means at least 85% hydrated within 30 minutes. In still another non-restrictive form, one or another or more of these hydration levels are achieved within 30 minutes, alternatively within 15 minutes, and in another non-limiting embodiment within 5 minutes.

The methods and compositions herein will now be further illustrated with more specific Examples, but these Examples are not intended to limit the methods and compositions herein in any respect, but are provided to further show and describe them.

EXAMPLE 1

Various Microemulsion Formulations

Several different mixtures were developed to form and hydrate HEC as shown in Table I. These were mixed as follows: A small amount of hydrophobic diluent (2-5 grams) was mixed with an ethoxylated nonyl phenol to create a solution of a uniform amount of mid-range surfactant blended in a viscous diluent oil. Other surfactants and other less viscous hydrophobic diluents were then added. A polyhydric alcohol was then added and mixed. The resulting mixture was a translucent to transparent microemulsion. To these microemulsions was added HEC 250 HHRX polymer in an amount varying from 40-45% by weight; this polymer is available from Aqualon. This admixture rapidly hydrated and increased viscosity. By adding additional soy oil/NP 9 diluent, the viscosity could be adjusted to reach acceptable levels for field operations. This diluent mixture also served to slow the rate of HEC hydration. NP 9 refers to nonylphenol having 9 ethoxy groups adducted.

TABLE I

Various Microemulsion Formulations

| Components, grams | Micro 1 | Micro 2 | Micro 3 |
|---|---|---|---|
| NP 4 | 0.00 | 3.01 | 3.13 |
| Mineral oil | 41.90 | 50.23 | 51.93 |
| TOMADOL 23-6.5 | 1.16 | 2.08 | 1.66 |
| Diethylene glycol monoethyl ether | 19.00 | 20.14 | 21.57 |
| n-Butanol | 2.00 | 2.25 | 2.46 |
| Water | 1.50 | Trace* | Trace* |
| HEC | 14.63 | 31.84 | 67.00 |
| Diethylene triamine | 1.50 | 0.00 | 0.00 |

*Trace notes a minute amount of water to create the microemulsion.

The HEC admixtures of Table I do not have any known material that may be used successfully as a pre-hydrator (other than the amine activating material). Micro 2 was used to viscosity a 10 ppg (1.2 kg/l) calcium chloride brine. The results are shown in Tables II and IV. Table II shows the deflection during the first nine minutes and Table III shows the deflection across the range usually reported with a Fann 35G Viscometer.

TABLE II

Initial Deflection at 300 rpm

| Time, min. | Deflection, $sec^{-1}$ |
|---|---|
| 1 | 90 |
| 2 | 105 |
| 3 | 128 |
| 4 | 152 |
| 5 | 167 |
| 6 | 175 |
| 7 | 182 |
| 8 | 189 |
| 9 | 194 |

TABLE III

Deflection Across Range of 600-6 rpm

| rpm | 600 | 300 | 200 | 100 | 60 | 30 | 6 | PV, cp | YP, lbs/100 ft (g/m) |
|---|---|---|---|---|---|---|---|---|---|
| $sec^{-1}$ | 257 | 198 | 178 | 143 | 121 | 96 | 53 | 61 | 135 (187) |

TABLE IV

Deflection Across Range of 600-6 rpm

| rpm | 600 | 300 | 200 | 100 | 60 | 30 | 6 | PV, cp | YP, lbs/100 ft (g/m) |
|---|---|---|---|---|---|---|---|---|---|
| $sec^{-1}$ | 63 | 34 | 23 | 12 | 7 | 4 | 1 | 29 | 5 (7) |

PV refers to plastic viscosity with units of centipoises (cp). It is an approximation of the slope of a shear stress curve (deflection at different rpm speeds). The yield point (YP) is the intercept estimate for the same curve with units of lbs/100 ft (g/m or kg/m, as noted).

Table IV uses the same Micro 2 admixture where 19.2 ppg (2.3 kg/l) zinc bromide/calcium bromide is the brine. It should be noted that this brine normally does not viscosify very well. From these results it appears that a microemulsion generated admixture will hydrate very well, even if there is no pre-hydrating solvent in the admixture. However, if the brine is starved for water, like a 19.2 ppg (2.3 kg/l) brine, then a pre-hydrating solvent is necessary.

Micro 2 above was supplemented by adding 2% triethyl amine to the admixture. This HEC blend was then used at 6 lb/bbl (17 g/l) to viscosify 19.2 ppg (2.3 kg/l) zinc bromide. Those results are shown in Table V.

TABLE V

Micro 2 Supplemented with Triethyl Amine

| | Minutes (deflection in $sec^{-1}$) | | | | |
|---|---|---|---|---|---|
| rpm | 10 | 15 | 25 | 30 | 45 |
| 600 | 102 | 127 | 157 | 171 | 215 |
| 300 | 56 | 71 | 85 | 104 | |
| 200 | 39 | 50 | 68 | 77 | 111 |
| 100 | 23 | 29 | 40 | 47 | 64 |
| 60 | 15 | 19 | 29 | 33 | 47 |
| 30 | 9 | 11 | 17 | 22 | 31 |
| 6 | 4 | 4 | 6 | 8 | 12 |
| PV, cp | 46 | 56 | 72 | 67 | 83 |
| YP, lb/100 ft | 10 | 15 | 13 | 37 | 49 |
| (kg/m) | (1.9) | (2.8) | (2.4) | (6.9) | (9.2) |

EXAMPLE 2

Different Microemulsions with Pre-Hydrating Solvent in Admixture

Three different microemulsions (A1, A2 and A3) were prepared similarly to those of Example 1 in the proportions given in Table VI.

TABLE VI

Microemulsion Formulations

| Components, grams | A1 | A2 | A3 |
|---|---|---|---|
| Soy oil | 5.0 | 2.0 | 0.0 |
| Mineral oil | 0.0 | 0.0 | 2.5 |
| NP 9 | 1.0 | 1.0 | 1.0 |
| Diethylene glycol diethyl ether | 15.0 | 15.0 | 15.0 |
| Cocamide DEA | 2.0 | 2.0 | 2.0 |
| Ethylene glycol | 10.0 | 10.0 | 10.0 |
| TEGOPREN 5840 | 1.0 | 0.0 | 1.0 |
| TEGOPREN 5878 | 0.0 | 1.5 | 0.0 |

TABLE VI-continued

| | Microemulsion Formulations | | |
|---|---|---|---|
| Components, grams | A1 | A2 | A3 |
| Methyl soyate | 15.0 | 15.0 | 15.0 |
| Water | 10.0 | 1.0 | 1.0 |
| HEC 250 HHRX | 43.0 | 41.0 | 45.0 |
| Soy oil/NP 9-A | 4.0 | 2.0 | 2.0 |

In order to overcome the deficiencies for brines that lack sufficient water by themselves to initiate fast hydration, ethylene glycol and water were added to the admixtures to start the pre-hydration. In all three of these cases, the emulsions were clear before and after including water in the admixtures. These mixtures hydrated very rapidly such that additional non-polar oils would be required in practice to regulate the hydration process.

Table VII shows the results of adding 6 lb/bbl (17 g/l) of HEC to 19.2 ppg (2.3 kg/l) brine at 29° C. The viscosification is very rapid with the zinc/calcium brine having a uniform viscosity with no fish-eyes visible even at 1000× microscope magnification.

TABLE VII

Viscosification Results

| | Minutes (deflection in sec$^{-1}$) | | | | | |
|---|---|---|---|---|---|---|
| rpm | 5 | 10 | 15 | 25 | 30 | 120 |
| 600 | 85 | 115 | 147 | 191 | 210 | OS* |
| 300 | 45 | 65 | 80 | 117 | 131 | 254 |
| 200 | 30 | 47 | 66 | 88 | 100 | 197 |
| 100 | 17 | 26 | 39 | 55 | 64 | 141 |
| 60 | 11 | 18 | 27 | 40 | 47 | 113 |
| 30 | 7 | 11 | 16 | 25 | 30 | 84 |
| 6 | 3 | 4 | 6 | 9 | 12 | 42 |
| PV, cp | 40 | 50 | 67 | 74 | 79 | — |
| YP, lb/100 ft | 5 | 15 | 13 | 43 | 52 | — |
| (kg/m) | (0.9) | (2.8) | (2.4) | (8.0) | (9.7) | |

*off scale

EXAMPLE 3

Microemulsion Made for Storage Using Water as the Pre-Hydrating Solvent

A microemulsion was created where a minor amount of hydrophilic oil was used where the amount was dictated by that minimum amount required to cause a microemulsion to form. To this oil, 25% by weight (by weight of oil) of nonylphenol (NP-9) was added. Then diethylether was added along with cocoamide DEA and Tegopren 4840. This mixture was mixed with methyl soyate and ethylene glycol. The mixture was clear. To this mixture water was carefully added to nearly 25% by weight. At this point, the mixture was a clear microemulsion that had a whitish hue if made with mineral oil or a yellowish hue if made with soy oil and methyl soyate. To this mixture HEC was added in an amount ranging from 40 to 50% by weight. This mixture began to hydrate and thicken. A soy oil/NP-4 mixture was added at a 5 lb per barrel (14.3 g/l) level to 11.6 ppg (1.4 kg/l) calcium chloride and mixed at 300 rpm with a Fann 35 G viscometer. In less than one minute the deflection went off the scale (greater than 350 sec$^{-1}$). As a comparison, the composition of U.S. Pat. No. 4,762,965 only reached a 300 rpm deflection of 280 sec$^{-1}$ after one hour of mixing.

EXAMPLE 4

Microemulsions Made with Either Zinc Bromide or Calcium Chloride as the Pre-Hydration Solvent Microemulsions were prepared with either calcium chloride or zinc/calcium bromide as the aqueous component of the microemulsion. A clear emulsion was produced. An elevation in heat in the mixture was observed. Both emulsions were used as HEC pre-hydration admixtures. When added to 11.6 ppg (1.4 kg/l) brine both mixtures rapidly viscosified.

The admixture shown below in Table VIII was created to test another microemulsion/HEC admixture. The viscosification results are presented as Table IX.

TABLE VIII

Microemulsion A7-2

| Component | A7-2 Proportion, grams |
|---|---|
| Soy oil | 5.0 |
| Mineral oil | 0.0 |
| NP-4 | 1.0 |
| NP-9 | 2.0 |
| Diethylene glycol diethyl ether | 15.0 |
| Cocamide DEA | 4.0 |
| Ethylene glycol | 10.0 |
| TEGOPREN 5840 | 1.0 |
| Methyl sorbate | 10.5 |
| Water | 5.0 |
| HEC 250 HHRX | 48.0 |
| Soy oil/NP9-A | 5.2 |
| Soy oil/NP9-B | 5.0 |

TABLE IX

Viscosification Results for Example 4

| | Minutes (deflection in sec$^{-1}$) | | | | | | | |
|---|---|---|---|---|---|---|---|---|
| rpm | 0 | 1 | 6 | 15 | 20 | 30 | 40 | 45* |
| 600 | 55 | 66 | 117 | 153 | 214 | 272 | — | 195 |
| 300 | 30 | 35 | 67 | 91 | 132 | 172 | — | 140 |
| 200 | 21 | 25 | 48 | 66 | 99 | 134 | — | 120 |
| 100 | 12 | 14 | 27 | 39 | 62 | 90 | — | 90 |
| 60 | — | 9 | 10 | 18 | 27 | 45 | 73 | 68 |
| 30 | — | 5 | 6 | 11 | 16 | 29 | 56 | 46 |
| 6 | — | 3 | 3 | 4 | 6 | 10 | 28 | 20 |
| PV, cp | — | 25 | 31 | 50 | 62 | 82 | 55 | 100 |
| YP, lb/100 ft | — | 5 | 4 | 17 | 29 | 50 | 85 | 72 |
| (kg/m) | | (0.9) | (0.7) | (3.2) | (5.4) | (9.4) | (16) | (13) |

*45 minute column denotes the conventional method of viscosification

The 40 minute results in Table IX show the viscosity profile for a conventional admixture having 15% glycol as the pre-hydration solvent. The results to the left ranging from 0-40 minutes were obtained using the admixture of Table VIII where water was used in the microemulsion. It may be noted that this blend had a deflection of 214 sec$^{-1}$ at 20 minutes vs. 195 sec$^{-1}$ at 45 minutes for the conventional method.

In the foregoing specification, the methods and compositions have been described with reference to specific embodiments thereof, and have been suggested as effective in providing effective methods and compositions for prehydrating polymers for viscosified fluids. The viscosified fluids, whether or not they are brines, are expected to be useful when employed in a process to recover hydro-carbons from subterranean formations. Such oil field fluids include, but are not limited to, aqueous drilling fluids, drill-in fluids, completion fluids, fracturing fluids and/or workover fluids. However, it will be evident that various modifications and changes can be made thereto without departing from the broader spirit or scope as set forth in the appended claims. Accordingly, the specification is to be regarded in an illustrative rather than a restrictive sense. For example, specific combinations of microemulsion forming components, surfactants and co-surfactants, solvents, non-polar liquids, etc. and proportions thereof falling within the claimed parameters, but not specifically identified or tried in a particular composition to improve polymer hydration herein, are anticipated to be within the scope of this invention. Additionally, the methods and compositions of this invention may find utility in other applications besides aqueous fluids for use in hydrocarbon recovery processes, in one non-limiting embodiment in the production of fertilizers.

What is claimed is:

1. A method for hydrating a polymer comprising:
   forming a microemulsion by mixing water with a polar component and at least one surfactant of a type and in an amount effective to form a microemulsion and a co-surfactant, where the microemulsion comprises:
   from about 0.01 to about 5 wt % water,
   from about 5 to about 15 wt % polar component,
   from about 1 to about 20 wt % surfactant, and
   from about 1 to about 15 wt % co-surfactant;
   contacting the polymer with the microemulsion; and
   hydrating the polymer.

2. The method of claim 1 where the microemulsion further comprises a non-polar hydrocarbon oil and the surfactant is a nonionic surfactant having a hydrophilic/lipophilic balance (HLB) approximately the same as that of the nonpolar hydrocarbon oil.

3. The method of claim 2 where the non-polar hydrocarbon oil is selected from the group consisting of white mineral oil, olefins, soy oil, esters, plant oils, $C_{8-20}$ paraffins, silicone oils, polyalphaolefins, and mixtures thereof.

4. The method of claim 1 further comprising adding the polymer to brine.

5. The method of claim 4 further comprising:
   viscosifying the brine;
   incorporating the brine into a fluid selected from the group consisting of aqueous drilling fluids, drill-in fluids, completion fluids, fracturing fluids and/or workover fluids; and
   recovering hydrocarbons from subterranean formations using the fluid.

6. The method of claim 1 where the polymer is selected from the group consisting of hydroxyethyl cellulose (HEC), carboxymethylcellulose (CMC), hydroxyethylcarboxymethylcellulose (CMHEC), carrageenan, guar, xanthan gum, starch, scleroglucan, partially hydrated polyacrylimides (PHPA), acrylamido-methyl-propane sulfonate (AMPS) copolymers, and mixtures thereof.

7. The method of claim 1 where the microemulsion is a water-in-oil emulsion and the method further comprises precisely controlling the amount of water to be substantially all that is necessary to hydrate the polymer, but not excessively hydrate the polymer.

8. The method of claim 1 where the microemulsion has an absence of clay at least until the polymer is substantially hydrated.

9. The method of claim 1 further comprising reducing the rate of hydration by subsequently contacting the polymer with an additional mixture of a polar compound with a surfactant.

10. A method for hydrating a polymer comprising
    forming a microemulsion by mixing water with a polar component, a nonpolar hydrocarbon oil and at least one surfactant of a type and in an amount effective to form a microemulsion upon mixing, where the surfactant is a nonionic surfactant having a hydrophilic/lipophilic balance (HLB) approximately the same as that of the nonpolar hydrocarbon oil, and a co-surfactant, where microemulsion comprises:
    from about 0.01 to about 5 wt % water,
    from about 5 to about 15 wt % polar component,
    from about 1 to about 20 wt % surfactant, and
    from about 1 to about 15 wt % co-surfactant;
    contacting the polymer with the microemulsion; and
    adding the polymer to brine,
    where the method further comprises precisely controlling the amount of water to be substantially all that is necessary to hydrate the polymer, but not excessively hydrate the polymer.

11. The method of claim 10 where the polymer is selected from the group consisting of HEC, CMC, CMHEC, carrageenan, guar, xanthan gum, starch, scleroglucan, PHPA, AMPS copolymers, and mixtures thereof.

12. The method of claim 10 where the non-polar hydrocarbon oil is selected from the group consisting of white mineral oil, olefins, soy oil, esters, plant oils, $C_{8-20}$ paraffins, silicone oils, polyalphaolefins, and mixtures thereof.

13. The method of claim 10 where the microemulsion is a water-in-oil emulsion.

14. The method of claim 10 where the microemulsion has an absence of clay.

15. A method for hydrating a polymer comprising
    forming a microemulsion by mixing water with a polar hydrocarbon component and at least one surfactant of a type and in an amount effective to form a microemulsion upon mixing, where the surfactant has a hydrophilic/lipophilic balance (HLB) number greater than 10, a nonpolar diluent oil, and a co-surfactant having an HLB number of less than 5, and where the microemulsion comprises:
    from about 0.01 to about 5 wt % water,
    from about 5 to about 15 wt % polar component,
    from about 1 to about 20 wt % surfactant, and
    from about 1 to about 15 wt % co-surfactant;
    contacting the polymer with the microemulsion; and
    where the method further comprises precisely controlling the amount of water to be substantially all that is necessary to hydrate the polymer, but not excessively hydrate the polymer through controlling the rate of hydration by subsequently contacting the polymer with a mixture of a polar compound with a surfactant.

16. The method of claim 15 where the polymer is selected from the group consisting of HEC, CMC, CMHEC, carrageenan, guar, xanthan gum, starch, scleroglucan, PHPA, AMPS copolymers, and mixtures thereof.

17. The method of claim 15 where the non-polar diluent oil is selected from the group consisting of white mineral oil, olefins, soy oil, esters, plant oils, $C_{8-20}$ paraffins, silicone oils, polyalphaolefins, and mixtures thereof.

* * * * *